Figure 1:
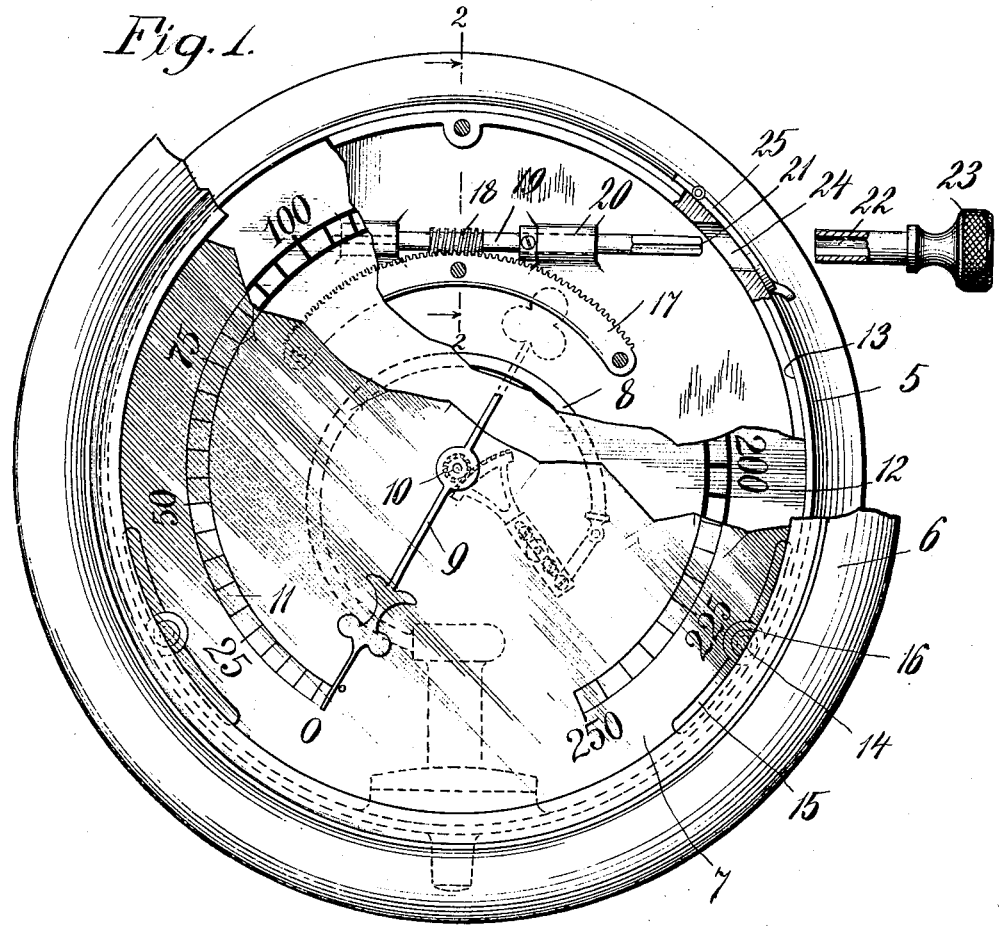

No. 873,034.  
PATENTED DEC. 10, 1907.

J. ELY.  
STEAM OR VACUUM GAGE.  
APPLICATION FILED MAY 2, 1907.

WITNESSES:  
Geo. A. Klimek  
Lymen S. Andrews Jr.

INVENTOR  
James Ely  
BY  
Chapin & Raymond  
his ATTORNEYS

UNITED STATES PATENT OFFICE.

JAMES ELY, OF SUMMIT, NEW JERSEY.

STEAM OR VACUUM GAGE.

No. 873,034.　　　Specification of Letters Patent.　　　Patented Dec. 10, 1907.

Application filed May 2, 1907. Serial No. 371,384.

*To all whom it may concern:*

Be it known that I, JAMES ELY, a citizen of the United States of America, and a resident of Summit, county of Union, and State of New Jersey, have invented certain new and useful Improvements in Steam or Vacuum Gages, of which the following is a specification, reference being had to the accompanying drawings, forming a part thereof.

My invention relates to improvements in steam or vacuum gages and particularly to means for adjusting the indicating means therefor.

It is well known that steam or vacuum gages of the Bourdon type gradually get out of register so that after a time they do not indicate pressure properly. The Bourdon tube tends to straighten out, or to bend over further, to a slight degree permanently, so that gradually the indicating means tends to indicate pressure higher or lower than is actually carried. Furthermore, gages arranged in various positions require initial adjustment to meet the varying conditions, initial pressure often being indicated where there is no pressure of steam, and an incorrect degree of pressure where pressure exists, due to the presence of a column of water in the connecting pipes and to other causes. To meet all these conditions it has been common in the past to open the gage, remove the indicating hand, and then re-set the hand to a position wherein proper indication shall be made. This, at best, is a clumsy method and not only entails loss of time but is liable to cause damage to the gage. Moreover, it is often very difficult to remove the hand, and still more difficult to delicately adjust it to its proper position when replacing it.

It is the object of this my present invention to provide means for adjusting the dial with respect to the hand, such adjusting means being operated from the exterior of the case. By this means I am not only enabled to adjust the gage from time to time without taking it apart, but I am also enabled to make an extremely delicate adjustment and all danger of injury to the gage is obviated.

To these ends my invention consists in a gage provided with a rotatable scale carrying dial instead of the stationary dial usually employed, and in means such as a worm wheel and screw for rotating the dial, said worm wheel provided with a removable key adapted to be inserted through an opening provided in the casing proper and to be removed and the opening closed over after the adjustment has been made. The worm wheel mechanism not only adjusts the dial, but holds the dial locked in its adjusted position when once so adjusted, so that it becomes impossible for the dial to be moved except by one having a key for the purpose.

In order that my invention may be fully understood I will now proceed to describe a device embodying my invention and will then point out the novel features in claims.

Figure 2:
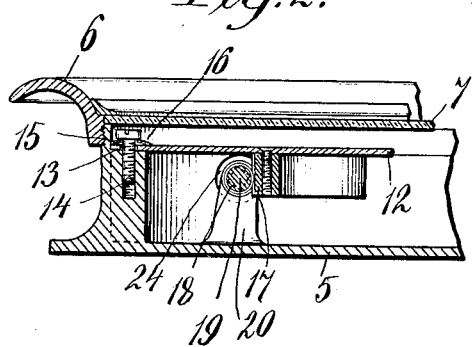
Figure 3:
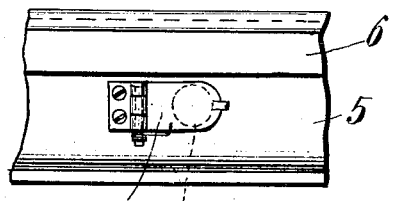

In the drawings Figure 1 is a face view of a gage in which adjusting means embodying my invention is employed, certain parts of the gage being broken away at various points in order to disclose other parts at the rear thereof. Fig. 2 is a detail sectional view upon the plane of the line 2—2 of Fig. 1. Fig. 3 is a detail view looking toward the side of the instrument opposite the point at which the key may be inserted for adjusting the instrument.

The gage generally is the ordinary type of Bourdon gage,—the casing comprising a body portion 5 and a cap ring 6 by which a disk of glass 7 is held in position. The Bourdon tube is shown at 8, such Bourdon tube having the usual or any desired connection with the indicating pointer or hand 9. The indicating pointer or hand 9 is mounted to rotate about the central pivot 10 and is designed to register with a scale 11 upon a disk 12. The disk 12 is usually made stationary, but in this instance it is loosely mounted in a shouldered portion 13 within the casing portion 5,—being free to rotate therein. It is maintained in its proper relative position in the casing member 5 by means of screws or studs 14, said screws or studs passing through slots 15, however, whereby rotative movement is permitted, and spring washers 16 are provided between the heads of the screws or studs 14 and the face of the disk 12, such washers tending to hold the disk firmly in position against chattering, but yielding slightly to permit the desired movements of adjustment. Secured to the rear of the disk 12 is a segment of a worm wheel 17, and a worm 18 is arranged in mesh with the teeth of said segment 17, said worm provided with an arbor 19 mounted in bearings 20 carried by the casing member 5, in which it is arranged to rotate freely. One end of the said arbor 19 is squared as at 21, such squared end being adapted to be received within the socket 22 of a key 23 made for the purpose. An opening 24 is provided within a casing member 5, axially in line with the arbor 19, through which the key 23 may be inserted to engage the portion 21 of the arbor 19, and I have provided a cap or closure 25 for closing the said opening when the key is not in position therein.

The operation of the device will be well understood from the foregoing. Whenever it is desired to adjust the device for any reason, the cap or closure 24 is opened and the key 23 inserted. Rotation of the key in one direction or the other will give the desired adjustment to the disk 12 and scale carried thereby. The gage may be then readily corrected for any inaccuracy and the key 23 afterwards removed. After the key has been removed the cap or closure 24 will be set back in place and the instrument used as before. The worm and wheel connection will lock the device against accidental movement, and it will further be seen that it will be necessary for the attendant to have a properly fitted key in order to make any adjustment at all. An ordinary simple form of squared end for the arbor is shown at 21, but any form may be employed such as will require a special key to fit it, so that by this means unauthorized tampering with the device will be impossible.

What I claim is:

1. In a steam gage, the combination with a casing, a rotatable indicating hand and means for rotating same in the operation of the device, of a rotatably mounted scale carrying disk, means arranged within the casing for rotatively adjusting same and for locking the disk in its adjusted position, and a removable key by which access may be had to such adjusting means from the exterior of the casing.

2. In a steam gage, the combination with a casing, a rotatable indicating hand and means for rotating same in the operation of the device, of a rotatably mounted scale carrying disk, worm teeth carried by said disk, a worm in engagement with said worm teeth, and a removable key fitted to said worm and by which access may be had thereto from the exterior of the casing.

3. In a steam gage, the combination with a casing, an indicating hand rotatably mounted therein and means for rotating same in the operation of the device, of a rotatively mounted scale carrying disk, said disk provided with slotted openings for receiving screws, screws received within said slotted openings and spring washers between the screws and the disk, worm wheel teeth carried by the disk upon the rear side thereof, a worm in engagement with said worm wheel teeth, an arbor for said worm wheel mounted wholly within the casing, said casing provided with an opening in line with said arbor, a movable closure for said opening, and a removable key arranged to be received within said opening and fitted to the arbor of said worm, substantially as set forth.

JAMES ELY.

Witnesses:
C. F. CARRINGTON,
L. S. ANDREWS, Jr.